United States Patent [19]  [11] Patent Number: 4,769,188
Graham et al.  [45] Date of Patent: Sep. 6, 1988

[54] METHOD OF FORMING A DECORATIVE FOAMED RESIN SPEAKER COVER

[76] Inventors: Gary T. Graham, 601 Dakota Ave., St. Cloud, Fla. 32769; Sara L. Gillen, 1011 S. Summerlin Ave., Orlando, Fla. 32806

[21] Appl. No.: 917,735

[22] Filed: Oct. 10, 1986

[51] Int. Cl.⁴ ........................ B29C 67/22; B29C 33/44
[52] U.S. Cl. ........................ 264/51; 264/129; 264/225; 264/338; 425/817 R
[58] Field of Search ............... 264/338, 54, 129, 225, 264/51; 425/817 R

[56] References Cited
U.S. PATENT DOCUMENTS

| 3,046,177 | 7/1962 | Hankins | 264/338 X |
| 3,101,244 | 8/1963 | Hood et al. | 264/338 X |
| 3,127,457 | 3/1964 | Di Pinto | 264/338 X |
| 3,359,351 | 12/1967 | Bender | 264/338 X |
| 4,028,450 | 6/1977 | Gould | 264/338 X |
| 4,055,613 | 10/1977 | Kapral | 264/338 X |
| 4,390,337 | 6/1983 | Gately | 264/338 X |

Primary Examiner—Philip Anderson
Attorney, Agent, or Firm—James H. Beusse

[57] ABSTRACT

A decorative speaker cover and a method for fabricating a speaker cover for use in a ceiling or wall comprising panels, the speaker cover having an appearance which blends with other panels so that it conceals the presence of a speaker system while providing satisfactory transmission of sound from the speaker system. The decorative speaker cover is fabricated by first forming a mold liner suitable for generating a facsimile of a ceiling or wall panel. Next, the mold liner is placed in a molding container and a closed cell expandable foam system is uniformly spread over the mold liner so that the foam rises vertically. The thickness of the resulting cast is reduced to a dimension below which acoustic transmission loss is not discernable by human ears.

4 Claims, 2 Drawing Sheets

METHOD OF FORMING A DECORATIVE FOAMED RESIN SPEAKER COVER

FIELD OF THE INVENTION

This invention relates to loudspeaker systems and, more particularly, deals with a novel decorative speaker cover for concealing a loudspeaker system.

BACKGROUND OF THE INVENTION

In the past, loudspeaker covers for walls and ceilings have been comprised of fabric stretched over a planar form. These covers normally do not enhance the aesthetic appearance of walls and ceilings and occasionally the resulting interruption of ornate patterns degrades the beauty of ceiling or wall designs. In order to overcome this problem a suitable speaker cover must be aesthetically similar to the wall or ceiling finish as well as being acoustically transparent so as not to noticeably affect sound radiated by the speaker system. In particular, there has been an interest in decorating restaurants and the like with artistic relief forms in the ceilings. For example, ceilings which comprise ornate metallic panels are becoming popular in restaurants and other commercial establishments to give the appearance of the late 19th and early 20th century. Moreover, even in rooms having modern modular drop ceilings or untextured wall panels, it is sometimes desirable to conceal the presence of a speaker system. Heretofore there has not been known a method for making low uniform density, acoustically transparent speaker covers which replicate ceiling and wall designs. Accordingly, there exits a need for decorative speaker covers which provide effective sound transmission for loudspeakers and yet so perfectly blend with the wall or ceiling surface that there is no visible evidence that a speaker cover is present.

SUMMARY OF THE INVENTION

The present invention has been developed for the purpose of obviating the aforesaid disadvantages of the prior art. Accordingly, the invention has as its most general object the provision of an acoustically transparent speaker cover which blends in with a wall or ceiling so as to disguise its presence. In one embodiment, the invention has as its further object the provision of a speaker cover having an artistic relief pattern similar to the surface of relief panels in ceilings or walls so as to maintain the ornamental shape and design of the surface.

Among the several objects of the present invention may also be noted the provision of a method for forming a speaker cover by replicating a ceiling or wall panel which replica when placed in a ceiling or wall has the identical visual appearance as the original panel but which differs from the original because it has a predetermined thickness and a low and uniform density which render the replica suitable for acoustic transmission in a speaker system; and the provision of a method for spreading a closed cell foam system in order to fabricate a panel having a low and uniform density, the panel being useful as a speaker cover which overcomes the above discussed limitations of fabric speaker covers known in the prior art.

Fabrication of a speaker cover with a particular relief design is accomplished generally by forming a mold liner of the ornamental shape and design. This may be accomplished by pouring a molding compound over a relief panel of the ceiling or wall. The liner is removed from the panel and placed in a mold. Closed cell foam is spread evenly over the mold and allowed to rise. A press is next placed over the foam approximately one inch above the molding surface to restrict the foam height. The excess foam is allowed to pour out the sides of the pressing apparatus. The foam is allowed to cure for an appropriate length of time. The cast is removed from the mold and the thickness is reduced by shaving or sanding. The resulting decorative speaker panel conforms to the exact ornamental shape and design of the ceiling or wall panel. It is comprised of closed cells in order to minimize density thus avoiding attenuation in acoustic transmission. The cast is sufficiently strong to support the load of a commercial speaker and yet thin enough to be adhesively attached to the diaphragm of a hemispherically radiating speaker system.

Other features and advantages of the present invention will become apparent from the following detailed description, taken in conjunction with the accompanying drawings, which illustrate, by way of example, the principles of the invention.

DETAILED DESCRIPTION OF AN ILLUSTRATIVE EMBODIMENT

As shown in the exemplary drawings, the present invention includes a decorative speaker cover and a method of making the decorative speaker cover. In a preferred embodiment, the speaker cover is molded in relief to match the corresponding appearance of an existing ceiling or wall panel. In use, it may be dropped directly into a T-bar type of suspended ceiling system or otherwise affixed to ceiling support members. With reference to the figures generally the cover is made by first forming a mold liner 26 from a panel to be duplicated by pouring a molding compound, such as, for example, silicone rubber, over the panel within a suitable form. After curing and removing from the form, the liner 26 is then placed in the bottom of a press on a hard surface. A closed cell foam in liquid form, such as, for example, a polyurethane foam, is spread over the entire mold surface and allowed to expand vertically as it cures. A press, i.e., a large flat plate, is placed a predetermined distance above the surface of the mold liner 26 to restrict the vertical expansion of the foam in order to control its density. Some foam escapes laterally from between the press and mold liner. The foam is allowed to cure and speaker cover 10 in relief is removed from the mold. The thickness of the speaker cover is then reduced to less than 0.7 cm by either shaving or sanding in order to form a thin sheet of a predetermined thickness. The resulting speaker cover matches the duplicated panel and may be glued onto the front surface of a speaker for concealing the speaker in a drop ceiling or panelled wall. Other methods well known in the art may be used to place the speaker system and cover in walls and ceilings which have ornate relief patterns.

Figure 1:
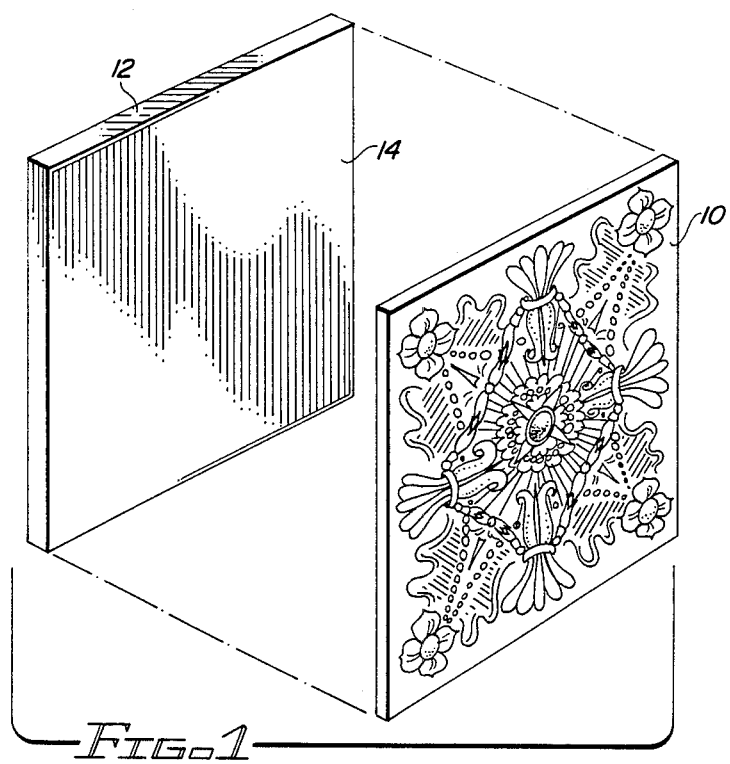
FIG. 1 is a perspective view of a decorative speaker cover embodying the present invention and is illustrated as mounted on the front of a loudspeaker.

By way of example, the speaker cover indicated generally by reference 10 in FIG. 1 is shown mounted on the diaphragm of a hemispherically radiating speaker system 12. The speaker cover 10 is formed in relief to match existing panels in the ceiling in which the speaker system is to be installed. The speaker system generally indicated as 12 in FIGS. 1, 2 and 3 may illustratively take the form of a BESC70D loudspeaker system, manufactured by B.E.S. Commercial Sound Products Division under their designation C70D and suitable for installation in a drop ceiling having "T" bar construction.

In the preferred embodiment, the speaker cover 10 is mounted on the surface of a planar diaphragm 14 with an adhesive bond along the edges of the contacting surfaces. Because speaker cover 10 is in physical contact with diaphragm 14 it radiates the acoustic vibrations generated in the diaphragm. The low density of the speaker cover assures that the frequency response of this radiating cover is consistent with the frequencies generated in the diaphragm. The inventor has discovered that suitable densities for the speaker cover range from approximately 1.9 to 2.2 lbs. per cubic foot. For a 23"×23" panel the overall weight should desirably be approximately 11 ounces.

Figure 2:
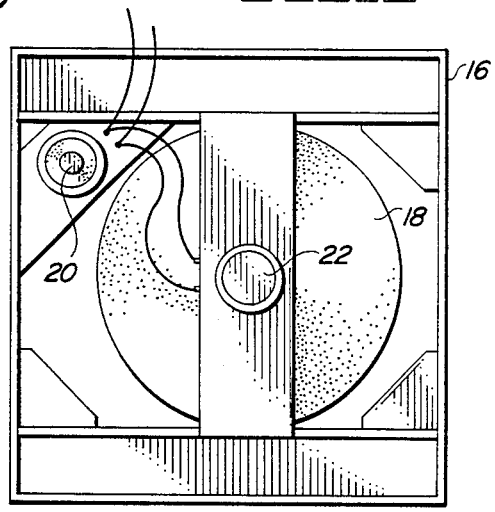
FIG. 2 represents the rear view of the loudspeaker showing the construction of the back of a loudspeaker system suitable for use with the inventive speaker cover.

Referring to FIG. 2 there is shown the back view of the loudspeaker system as described previously. An aluminum frame 16 supports the planar speaker diaphragm 14 and two independent magnetic circuits 20 and 22. In the preferred embodiment, this loudspeaker system fits into a standard Tbar frame for suspended ceiling systems having dimensions approximately 23 inches in length, 23 inches in width and 3 inches in depth.

Figure 3:
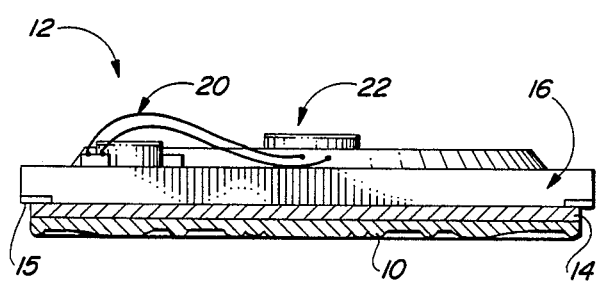
FIG. 3 is a side view of a loudspeaker system having the inventive speaker cover mounted on the front planar surface of the loudspeaker.

Referring now to FIG. 3 there is shown a side view of speaker system 12 having speaker cover 10 adhesively attached to the front surface of the planar diaphragm 14 of the loudspeaker system. The speaker cover, formed in relief to match an existing panel, is attached along the edges 15 of planar diaphragm 14 using an appropriate adhesive such as a latex glue. The adhesive selected should be of a type which does not corrode the material of either the cover 10 or the speaker diaphragm 14. Solvent glues can be used if the mating surfaces are protected by non-sensitive coverings such as a latex paint. When placed in a ceiling or wall the front surface of speaker cover 10 replicates the ornamental shape and design of existing panels.

A method for making a relief speaker cover which duplicates the appearance of a panel is now described in detail. First, a panel to be duplicated is used to form a mold. Silicone rubber or another suitable molding compound is poured over the panel and allowed to dry completely, i.e., to cure. This results in a mold liner having a mirror image of the ornamental design and shape of the panel surface.

Figure 5:
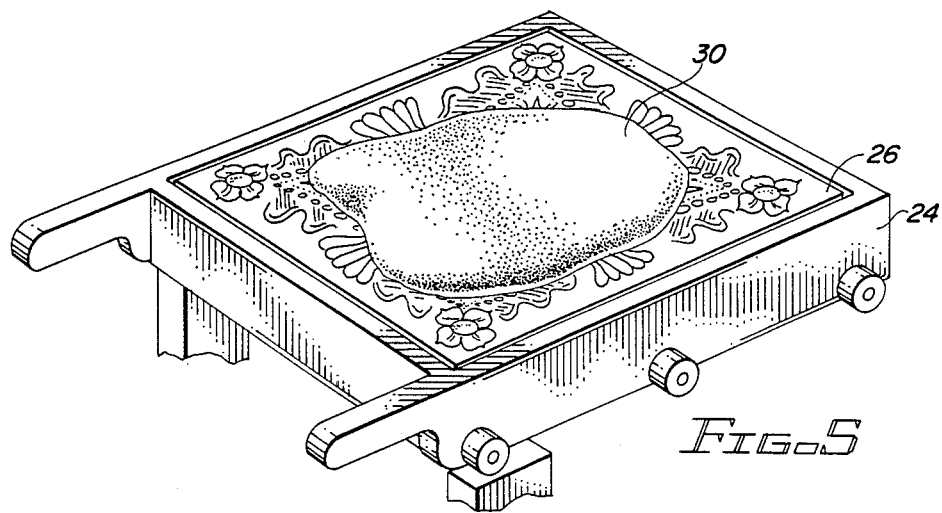
FIG. 5 shows disbursement or "wetting out" of the mold surface by the yet unexpanded foam medium over the entire surface of the mold liner achieved by tilting of the mold container.
Figure 4:
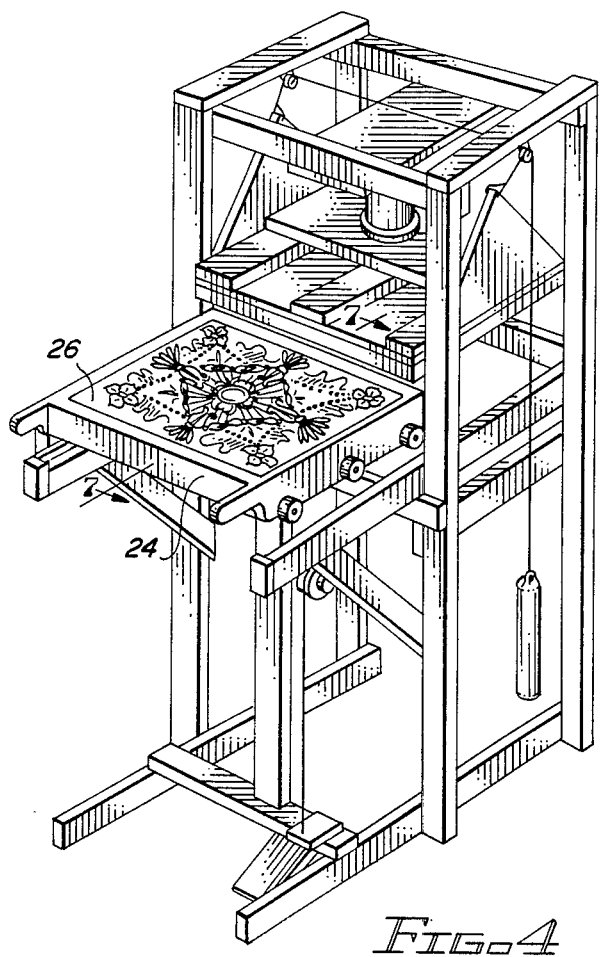
FIG. 4 illustrates a mold used to form the decorative speaker cover.

Referring to FIG. 4, mold liner 26 is placed in molding container 24. A predetermined amount of closed cell low density pour foam material such as a system based on polymeric isocyanate is then poured onto the mold liner. As illustrated in FIG. 5, mold container 24 is pivotally mounted on a gimbal (not shown) so that the foam may be evenly spread over mold liner 26 by tilting the mold container about the gimbal. This method of spreading of the liquid foam has been found necessary for controlling the uniform density of the finished panel. If the foam is allowed to expand along the mold liner surface, friction at the foam/liner interface causes collapse of many of the cells. So long as the entire surface of mold liner 26 is wetted with foam that has undergone minimal expansion, expansion is limited to a vertical direction above the mold liner. Otherwise, with expansion occurring along the mold surface, the distribution of foam cells becomes uneven and a substantial number of cells break open forming a dense skin on the relief surface. With the expansion occurring normal to the relief surface, the finished speaker cover accurately replicates the indentations and contours of the mold liner and has a uniform density.

Figure 6:
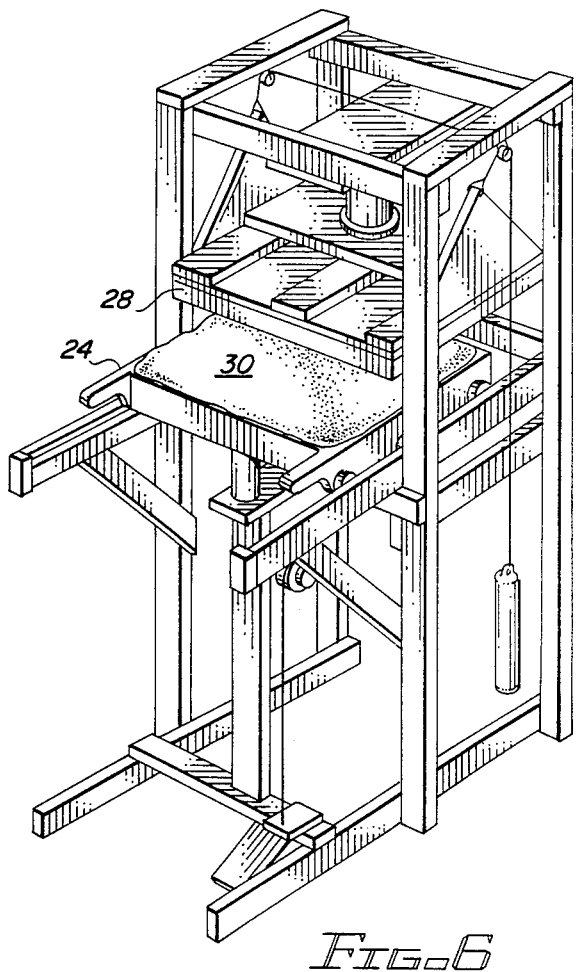
FIG. 6 illustrates placement of a mold container under a press.

Referring next to FIG. 6, the mold container 24 is positioned underneath press 28 immediately after spreading of the liquid foam material. As the foam expands, it presses up against the bottom surface of press 28 and flows over the edges of the mold container 24.

Figure 7:
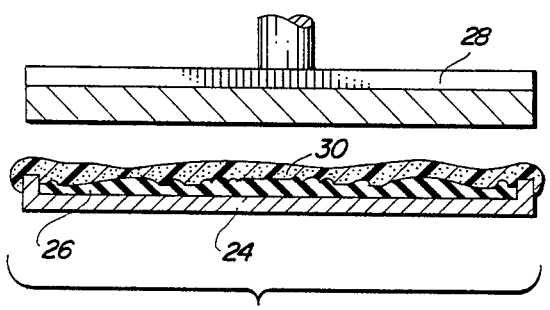
FIG. 7 shows a foam casting medium expanding over a mold.

Referring to FIG. 7 there is shown foam 30 expanding normal to the surface of mold liner 26. The press 28 is placed a predetermined distance from the surface of the design mold liner 26. As foam 30 expands it eventually contacts the bottom surface of press 28 and flows over the sides of the molding container 24. By adjusting the height of press 28 the density and weight of foam 30 can be controlled. For instance, if press 28 is moved further away from mold liner 26 a given amount of liquid foam will result in a panel which is relatively thick and of low density mass per unit volume. Moving press 28 closer to the surface of design mold 26 restricts the escape of foam, thus causing the density of foam 30 to increase and the thickness of the resulting panel to decrease. Once foam 30 cures, the resulting panel 32 and rubber mold 26 are removed from the press.

Figure 8:
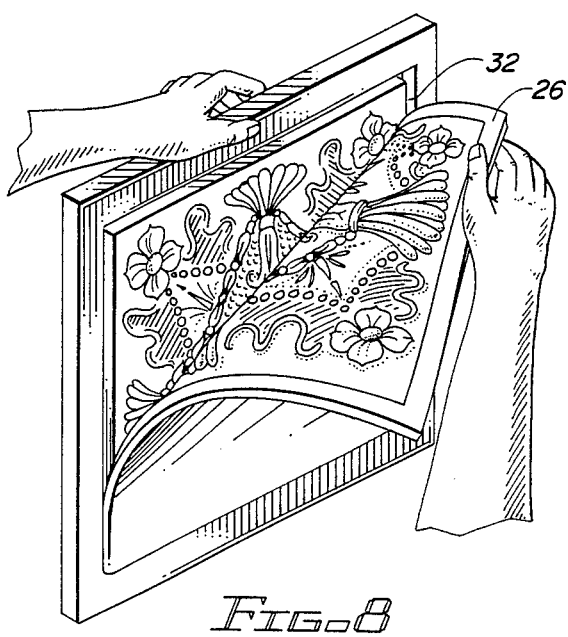
FIG. 8 shows the process of removing a rubber mold from the inventive speaker cover.

Referring to FIG. 8 there is shown the process of removing the rubber mold liner 26 from the formed panel 32. Panel 32 is then cut and shaped to the desired thickness and length and width. The thin panel is colored to match the wall or ceiling design and is then adhesively attached as described above by an appropriate adhesive to the front planar surface of the loudspeaker system. It is noted that while attachment of the cover to the surface of the loudspeaker system is often preferred, it is not essential to the invention. Furthermore, if the finished panel is a uniform color, such color may be mixed into the liquid foam material.

Thus there has been shown a decorative speaker cover and a method of making the same in which the speaker cover includes the exact ornamental shape and design of a ceiling or wall panel. It is understood that the design of the inventive speaker cover can replicate any ornamental pattern and may form an integral part of a pattern, design or image which is greater in size than the speaker cover dimensions. The inventive cover may also be painted, dyed or otherwise colored to blend with other panels.

The speaker cover hides the front surface of a loudspeaker system which is placed in a ceiling or wall.

While minimizing the loss of acoustic energy transmitted through the cover the inventive foam speaker cover also serves as a medium for replicating designs, textures, relief patterns and other visual images thus simulating wall or ceiling panels fabricated out of metal, fiberboard and other building materials. Several particular forms of the invention have been illustrated and described, but it will also be apparent that various modifications can be made without departing from the spirit and scope of the invention.

We claim:

1. A method of forming a decorative speaker cover to be placed in a ceiling or wall comprising an array of panels wherein the panels contain an ornamental relief, the method comprising the steps of:
   (a) forming a mold liner having a surface duplicating a ceiling panel's ornamental relief;
   (b) placing the mold liner into a molding container having a pedetermined height measured from a plane of the mold liner surface;
   (c) pouring a closed cell expandable foam into the molding container and spreading it over the mold liner so that indentations in the mold liner corresponding to the ornamental relief are filled with foam in order to form a cast of the ornamental relief;
   (d) allowing the foam to rise vertically above the height of the molding container in order to control the density of the cast; and
   (e) trimming the cast to reduce its thickness to a dimension having an acoustic transmission loss not discernible by human ears.

2. The method of claim 1 further comprising the steps of tilting the mold container about a center axis immediately after the foam is poured so that the mold liner is wetted with foam which has undergone minimal expansion.

3. The method of claim 1 further comprising the step of:
   using a press with an adjustable height over the mold in order to control the escape of foam and the resulting thickness of the cast.

4. The method of claim 1 further comprising the step of coloring the relief surface of the cast in order to match a ceiling or wall.

* * * * *